Patented Dec. 14, 1948

2,456,593

UNITED STATES PATENT OFFICE 2,456,593

SILVER BRAZING ALLOY CONTAINING INDIUM

Joseph F. Polak, Newark, N. J., assignor to Monroe Sherman, New York, N. Y.

No Drawing. Application March 22, 1945, Serial No. 584,248

3 Claims. (Cl. 75—134)

My invention relates generally to alloys used for brazing and similar purposes, and particularly relates to brazing alloys having relatively low melting and flow points.

The main object of my invention is the provision of an alloy suitable for brazing, which alloy includes indium.

Another object of my invention is the provision of a brazing alloy have a relatively low melting and flow point for use in brazing a wide variety of materials, i. e., pure metals or metal alloys.

Other objects of my invention will be obvious from the following descriptions of illustrative embodiments thereof.

Many commercially available brazing alloys contain silver, copper, zinc and cadmium, but I have found that the addition of indium to these conventionally used metals makes for a brazing alloy having a much wider field of utility than conventionally known brazing alloys.

My new and improved alloy is well adapted for use in processing either pure metals or alloys thereof, and in the following specification, I will use the term "metals" to indicate the materials being brazed, welded and/or soldered, both pure metals and alloys thereof. The term "alloy" will be used to designate the material employed in the brazing, welding and/or soldering processes.

I have found that brazing alloys prepared from within the following range are extremely useful, having melting and flow points which are below the points at which a great variety of the materials it might be desired to braze may be harmed by higher heat:

| Metal: | Percent by weight |
|---|---|
| Silver (Ag) | 35 to 48 |
| Copper (Cu) | 10 to 15 |
| Zinc (Zn) | 12 to 17 |
| Cadmium (Cd) | 12 to 20 |
| Indium (In) | 2.5 to 20 |

One specific example of a brazing alloy prepared according to and embodying my invention is:

| Metal: | Percent by weight |
|---|---|
| Silver | 45.50 |
| Copper | 13.50 |
| Zinc | 15.50 |
| Cadmium | 16.50 |
| Indium | 9.00 |

This particular brazing alloy will become liquid and free flowing at about 1100° F., a temperature substantially lower than those brazing alloys commercially available.

A second specific brazing alloy prepared in accordance with and embodying my invention is:

| Metal: | Percent by weight |
|---|---|
| Silver | 41.40 |
| Copper | 13.00 |
| Zinc | 15.10 |
| Cadmium | 16.40 |
| Indium | 14.10 |

This specific brazing alloy will become liquid and free flowing at about 1035° F., which is lower than the first example.

I have found that good results may be obtained in my brazing alloy by including a significant amount of tin along with the indium. However, when both tin and indium are used, the aggregate amount thereof should not exceed 20% of the total weight of elements in the brazing alloy. In the second specific example of a brazing alloy in accordance with my invention, I may include instead of the 14.10% of indium, 9.10% of tin and 5% of indium.

Commercially known brazing alloys and the like have a rather high melting and flow point of about 1175° F., which limits their utility in the brazing of metals wherein the critical temperatures would be reached at or about the time the alloys become liquid and free flowing. The duration of the application of heat and the degree of heat are both factors to be considered, and with brazing alloys which melt and flow at about 1175° F., there is danger of damage to the metals being brazed, because the critical temperatures of the steels and the annealing temperatures of non-ferrous metals may well be reached before the high temperature brazing alloys will melt and flow.

These conventional high temperature brazing alloys cannot be safely used when it is desired to make a second brazed joint in an assembly which has already been brazed, for the heat needed to make the second joint may cause a melting and flowing in the area of the first joint.

Further, thin metal sections being brazed with the conventionally known high temperature alloys (i. e., those melting and flowing at about 1175° F.) present their own particular problem, for the application of heat thereto is very difficult to control and there is ever present the likelihood that the thin sections will be melted or otherwise damaged before the brazing alloys will melt and flow.

My new and improved brazing alloy has a much wider field of utility than those heretofore known, for it will melt and flow at much lower temperatures; thin section materials may be operated upon with relatively little danger; a number of joints may be brazed in the same general area; and the critical temperatures or annealing temperatures of the metals being worked upon need not be approximated.

Having now described my invention, what I claim and desire to secure by Letters Patent is:

1. An alloy consisting of, by weight, silver between 35% and 48%, copper between 10% and 15%, zinc between 12% and 17%, cadmium between 12% and 20%, and indium between 9% and 20% with no other metals therein.

2. An alloy comprising, by weight, substantially 45.50% of silver, 13.50% of copper, 15.50% of zinc, 16.50% of cadmium and 9% of indium.

3. An alloy comprising, by weight, substantially 41.40% of silver, 13% of copper, 15.10% of zinc, 16.40% of cadmium and 14.10% of indium.

JOSEPH F. POLAK.

REFERENCES CITED

The following references are of record in the file of this patent:

UNITED STATES PATENTS

| Number | Name | Date |
|---|---|---|
| 1,934,730 | Murray | Nov. 14, 1933 |
| 2,157,933 | Hensel | May 9, 1939 |
| 2,196,306 | Hensel | Apr. 9, 1940 |
| 2,235,634 | Hensel | Mar. 18, 1941 |
| 2,288,654 | Smart | July 7, 1942 |
| 2,362,893 | Durst | Nov. 14, 1944 |
| 2,374,183 | Durst | Apr. 24, 1945 |

OTHER REFERENCES

Steel, November 9, 1942, page 81.

Product Engineering, October 1943, pages 630, 631.